US011188370B2

(12) United States Patent
Freche et al.

(10) Patent No.: US 11,188,370 B2
(45) Date of Patent: Nov. 30, 2021

(54) MEMORY SCHEDULER USING GUEST-ORIGINATED STATISTICS

(71) Applicant: VMware, Inc., Palo Alto, CA (US)

(72) Inventors: Julien Freche, Mountain View, CA (US); Philip Peter Moltmann, Menlo Park, CA (US); Jui-Hao Chiang, Redmond, WA (US)

(73) Assignee: VMware, Inc., Palo Alto, CA (US)

( * ) Notice: Subject to any disclaimer, the term of this patent is extended or adjusted under 35 U.S.C. 154(b) by 92 days.

(21) Appl. No.: 16/256,968

(22) Filed: Jan. 24, 2019

(65) Prior Publication Data

US 2020/0241902 A1 Jul. 30, 2020

(51) Int. Cl.
G06F 9/455 (2018.01)
G06F 9/50 (2006.01)
G06F 12/1009 (2016.01)
G06F 9/48 (2006.01)

(52) U.S. Cl.
CPC ...... G06F 9/45558 (2013.01); G06F 9/45545 (2013.01); G06F 9/4881 (2013.01); G06F 9/5016 (2013.01); G06F 12/1009 (2013.01); G06F 2009/45583 (2013.01)

(58) Field of Classification Search
CPC ............. G06F 9/45558; G06F 9/45545; G06F 9/4881; G06F 9/5016; G06F 12/1009; G06F 2009/45583
See application file for complete search history.

(56) References Cited

U.S. PATENT DOCUMENTS

| 9,038,068 | B2 * | 5/2015 | Engle | G06F 9/5022 718/1 |
| 2011/0138147 | A1 * | 6/2011 | Knowles | G06F 9/45558 711/170 |
| 2012/0124305 | A1 * | 5/2012 | Weissman | G06F 12/08 711/160 |
| 2015/0161055 | A1 * | 6/2015 | Deguillard | G06F 9/455 711/6 |
| 2015/0161056 | A1 * | 6/2015 | Deguillard | G06F 9/5016 711/6 |
| 2015/0363133 | A1 * | 12/2015 | Bobroff | G06F 9/45558 711/170 |

OTHER PUBLICATIONS

Waldspurger, Carl A. Memory Resource Management in VMware ESX Server. [online] ACM., pp. 181-194. Retrieved From the Internet <https://dl.acm.org/doi/pdf/10.1145/844128.844146> (Year: 2002).*

* cited by examiner

Primary Examiner — Emerson C Puente
Assistant Examiner — Jonathan R Labud

(57) ABSTRACT

A memory scheduler in a hypervisor allocates physical memory to virtual machines (VMs) based on memory usages metrics generated within the VMs and provided to the hypervisor. More particularly, the memory scheduler determines an allocation target for each VM based on a guest-generated memory usage metric associated with the VM. The allocation target can be increased or decreased from its previous value to reflect changing needs in the VM. Physical memory is allocated when a VM requests it, and is reclaimed during a reclamation process based on its associated allocation target.

18 Claims, 11 Drawing Sheets

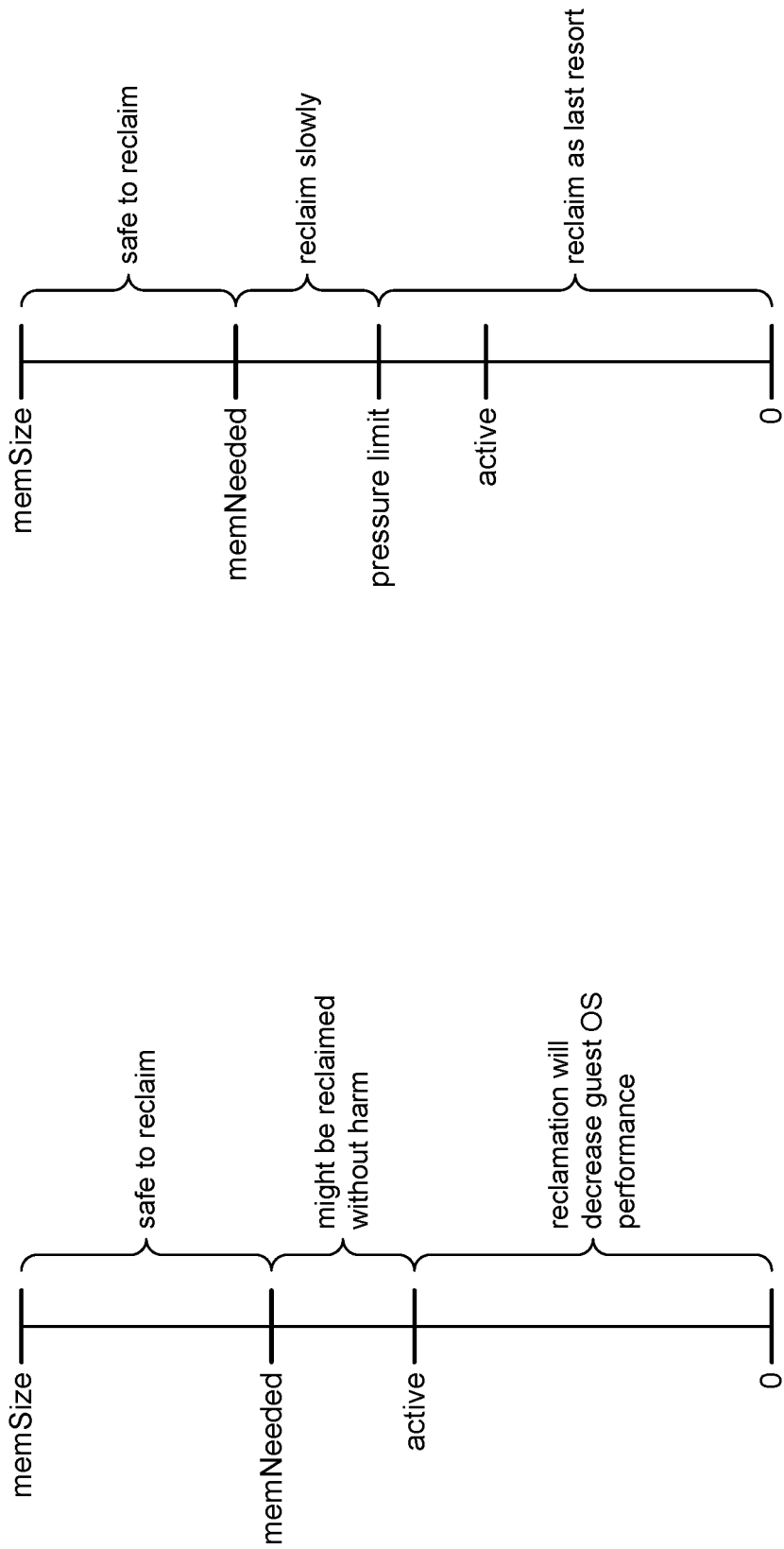

```
function GFMS (vms, alloc)

702 {   for all vm in vms do
            vm.allocMin = vm.reservation
            vm.allocMax = vm.limit
            vm.allocationTarget = 0    \\ initially, no allocation
        end for alloc = DistributeMemory (vms, alloc)

704 {   for all vm in vms do
            vm.allocMin = max(vm.reservation, vm.memNeeded)
        end for alloc = DistributeMemory (vms, alloc)

706 {   for all vm in vms do
            vm.allocMin = max(vm.reservation, vm.pressureLimit)
        end for DistributeMemory(vms, alloc)

end function
```

FIG. 7

― distribution, 800

```
function DistributeMemory(vm, alloc)

ExtraMemoryList = EmptyList()          \\ create list
    WantedMemoryList = EmptyList()         \\ create list
    totalGranted = 0 for all vm in vms do
        granted = (alloc * vm.shares) / totalShares if vm.allocTarget + granted > vm.allocMax then
            granted = vm.allocMax - vm.allocTarget
        end if vm.allocTarget = vm.allocTarget + granted
        totalGranted = totalGranted + granted delta = vm.allocTarget - vm.allocMin
        if delta  0  then
            extra = extra + delta
            ExtraMemoryList.add(vm)            \\group B
        else
            wanted = wanted - delta
            WantedMemoryList.add(vm)           \\group A
        end if
    end for alloc = alloc - totalGranted
    alloc = ReclaimExtraMemory(ExtraMemoryList, min(extra, wanted))
    alloc = DistributeExtraMemory(WantedMemoryList, alloc)

end function
```

FIG. 8

```
function ReclaimExtraMemory(vms, memoryToReclaim)

totalReclaimed = 0 for all vm in vms do
            reclaim = (memoryToReclaim * vm.InvShares) / totalShares
            reclaim = min(reclaim, vm.allocTarget - vm.allocMin)
            totalReclaimed = totalReclaimed + reclaim
            vm.allocTarget = vm.allocTarget - reclaim
    end for memoryToReclaim = memoryToReclaim − totalReclaimed if memoryToReclaim = 0 then
            return totalReclaimed
    end if for all vm in vms do
            reclaim = min(memoryToReclaim, vm.allocTarget - vm.allocMin)
            totalReclaimed = totalReclaimed + reclaim
            vm.allocTarget = vm.allocTarget - reclaim
    end for return totalReclaimed end function
```

FIG. 9

```
function DistributeExtraMemory(vm, alloc)

alloc = DistributeBelowAllocMin (vms, alloc)

if alloc = 0 then
            return 0
    end if alloc = DistributeBelowAllocMax(vms, alloc)
    return alloc end function
```

FIG. 10

```
function DistributeBelowAllocMin(vms, alloc)

totalGranted = 0 for all vm in vms do
        granted = (alloc * vm.shares) / totalShares if vm.allocTarget + granted > vm.allocMax then
            granted = vm.allocMax - vm.allocTarget
        end if if vm.allocMin < vm.allocTarget + granted then
            granted = vm.allocMin - vm.allocTarget
        end if vm.allocTarget = vm.allocTarget + granted
        totalGranted = totalGranted + granted
    end for alloc = alloc – totalGranted for all vm in vms do
        granted = min(alloc, vm.allocMin - vm.allocTarget)

if vm.allocTarget + granted > vm.allocMax then granted = vm.allocMax - vm.allocTarget
        end if vm.allocTarget = vm.allocTarget + granted
        alloc = alloc - granted
    end for return alloc end function
```

FIG. 10A

```
function DistributeBelowAllocMax(vms, alloc)

totalGranted = 0 for all vm in vms do
        granted = (alloc * vm.shares) / totalShares if vm.allocTarget + granted > vm.allocMax then
            granted = vm.allocMax - vm.allocTarget
        end if vm.allocTarget = vm.allocTarget + granted
        totalGranted = totalGranted + granted
    end for alloc = alloc – totalGranted for all vm in vms do
        granted = min(alloc, vm.allocMax - vm.allocTarget)
        vm.allocTarget = vm.allocTarget + granted
        alloc = alloc - granted
    end for return alloc end function
```

FIG. 10B

| Values | VM1 | VM2 |
|---|---|---|
| memSize | 2000 | 2000 |
| Shares | 1 | 1 |
| Reservation | 0 | 0 |
| Limit | -1 | -1 |
| memNeeded | 1250 | 750 |

| Step | VM1 | VM2 |
|---|---|---|
| 1 | 1000 | 1000 |
| 2 | 1250 | 750 |
| 3 | 1250 | 750 |

} allocation targets

FIG. 11

| Values | VM1 | VM2 |
|---|---|---|
| memSize | 2000 | 2000 |
| Shares | 1 | 1 |
| Reservation | 0 | 0 |
| Limit | -1 | -1 |
| memNeeded | 1400 | 1300 |
| active | 1100 | 500 |
| pressure Limit | 1250 | 750 |

| Step | VM1 | VM2 |
|---|---|---|
| 1 | 1000 | 1000 |
| 2 | 1000 | 1000 |
| 3 | 1250 | 750 |

} allocation targets

FIG. 12

MEMORY SCHEDULER USING GUEST-ORIGINATED STATISTICS

BACKGROUND

In a virtualized environment having multiple virtual machines (VMs) running over a hypervisor on a physical host machine, there are two levels of memory mapping. One level of memory mapping is introduced by the hypervisor between the virtualized guest "physical" memory (usually referred to as guest physical memory, which the VM "believes" is the actual hardware memory available on the VM, but which is a software construct of the hypervisor) and the actual underlying physical hardware "machine" memory (usually referred to as machine physical memory or physical memory) on the host machine. The second level of memory mapping is introduced by an operating system managing the VM (referred to as guest OS) between guest virtual memory (memory space assigned to a program in the guest OS) and guest physical memory (the physical computer memory available on the VM).

In such a virtualized environment, it is desirable to maximize host machine utilization by achieving a high consolidation ratio, which is the number virtual machines (VMs) per physical host machine. A memory scheduler in the hypervisor of the host machine tries to provide high consolidation while maintaining adequate performance and fairness among deployed VMs. To control memory allocation, an administrator can specify allocation parameters referred to as memory reservation, limit and shares (RLS) for each VM. Memory reservation provides a guarantee of a minimum amount of memory available to the VM, while memory limit puts an upper bound on the allocation. Memory shares set relative priority of VMs in their memory allocation.

To compute a memory allocation target for a VM, the memory scheduler can use the VM's RLS settings and a working set size estimate. When two VMs have the same RLS settings, the VM with larger working set should receive more memory allocation. Without RLS settings, which impose constraints on memory allocation, the ideal allocation to a VM should be just equal to its working set size, which is a minimum memory allocation that does not hurt VM's performance.

In order to estimate a VM's working set, one approach is to intercept accesses to the guest "physical" address space (i.e., the physical address space in the VM), which can be done by removing the privilege of guest page table entry in the hypervisor so as to trap every memory page access. However, this mechanism is impractical due to the heavy overhead of trapping each memory read/write. To avoid this problem, the memory scheduler can use a statistical sampling approach to estimate memory working set; a random set of pages is selected in the guest physical address space during each epoch and their accesses are intercepted at the hypervisor level. The working set size of the VM can be estimated by the percentage of accesses within the sampled pages. This method has low performance overhead, but is susceptible to high error rates due to the sampling. Such inaccuracy can cause wrong decisions to be made on memory distribution and introduce VM performance penalty, e.g., memory can be reclaimed unnecessarily from a VM that has higher memory demand than others.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 3 and 4 illustrate classes of reclaimable memory in accordance with the present disclosure.

FIGS. 7, 8, 9, 10, 10A, and 10B show pseudo-code for memory scheduling in accordance with the present disclosure.

FIGS. 11 and 12 illustrate examples for memory reclamation in accordance with the present disclosure.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
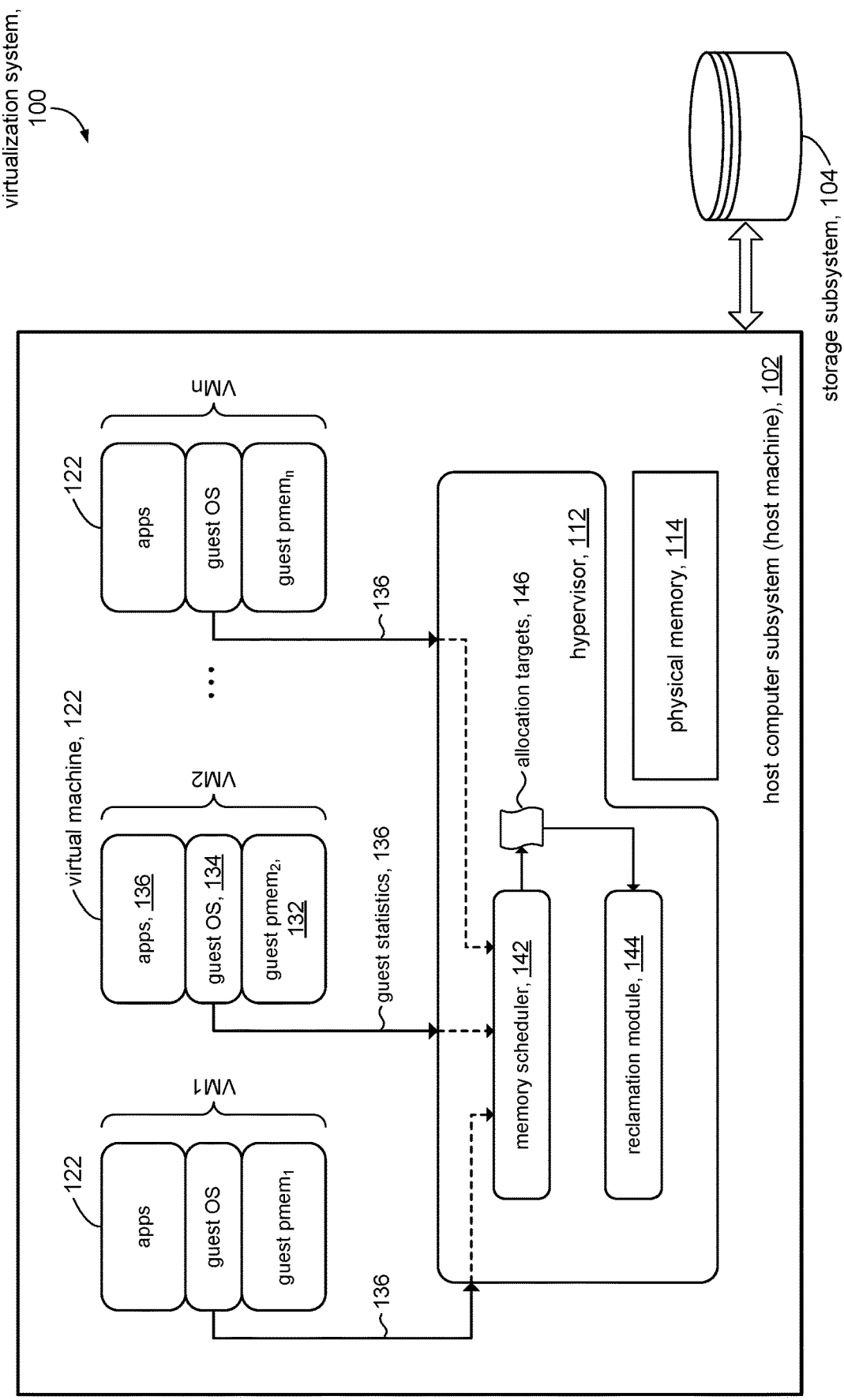
FIG. 1 shows a virtualization system in accordance with some embodiment of the present disclosure.

FIG. 1 shows a virtualization system 100 in accordance with the present disclosure that includes a host computer subsystem (host machine) 102 and a storage subsystem 104. The host machine 102 can include a hypervisor 112 configured to deploy and support the execution of virtual machines 122, including emulating guest physical memory 132 (e.g., a virtual RAM) for each virtual machine 122. Each of the virtual machines 122 is configured with some amount of guest physical memory 132 so that it can carry out tasks of a guest operating system (guest OS) 134 installed on the virtual machine to support the execution of guest applications 136 on the virtual machines. The host machine 102 can include machine physical memory (referred to herein as "physical memory") 114 to back the guest physical memory 132 that is configured with each virtual machine 122. A unit of guest physical memory 132 (e.g., a page) is "backed" by physical memory 114 when that unit of guest physical memory corresponds to one or more units (e.g., pages) of physical memory 114.

The hypervisor 112 can include a memory scheduler 142. The amount of guest physical memory 132 that can be allocated to the virtual machines 122 can exceed the amount of actual physical memory 114 that is available on the host machine 102. This condition is referred to as memory over-commitment. As a result, during operation, the available physical memory 114 may become scarce, and the competing demands on the available physical memory of the host machine by the virtual machines 122 need to managed in such a manner that each virtual machine 122 is given a portion of physical memory it needs. In some embodiments, the memory scheduler 142 can make decisions that affect the reclamation of physical memory 114 that is allocated from some virtual machines 122 so that the physical memory 114 can be re-allocated to other virtual machines 122. In accordance with the present disclosure, the memory scheduler 142 can compute or otherwise determine allocation targets 146 for the virtual machines 122 based on statistics 136 obtained from the virtual machines 122. The allocation target 146 for a given virtual machine can server to indicate whether the virtual machine has be allocated too much physical memory 114. This aspect of the present disclosure is discussed in more detail below.

The hypervisor 112 can include a reclamation module 144 to reclaim physical memory allocated to each virtual machine 112. In some embodiments, the reclamation (de-allocation) of physical memory 114 allocated to a virtual machine 122 can be based on its associated allocation target 146. If the amount of physical memory 114 allocated to a virtual machine 122 exceeds its associated allocation target 146, then the reclamation module 144 may reclaim physical memory from that virtual machine to reduce the amount of allocated physical memory. In some embodiments, for example, the reclamation module 144 may reclaim just enough physical memory 114 from a virtual machine 122 to reduce the amount of allocated physical memory to the associated allocation target 146.

In some embodiments, the reclamation module 144 can support various reclamation algorithms, including but not limited to ballooning, swapping, page sharing, and compression.

Ballooning can reclaim memory pages without any noticeable effect on the workload of a virtual machine 122 (e.g., VM1). It operates by using a per-VM guest OS balloon driver. When the memory scheduler 142 wants to reclaim memory pages from VM1, it increases the allocation target (balloon target) of VM1 which causes the balloon driver for that virtual machine to allocate pages from the guest OS, pin them, and release them to the hypervisor 112. The hypervisor 112 then repurposes the physical memory 114 that backs the pages released by the virtual machine, e.g., for reallocation to other virtual machines 122 (e.g., VM2, VMn, etc.).

Swapping is another reclamation process. In this process, the contents of a guest page currently stored in physical memory 114 are stored in persistent storage (e.g., storage subsystem 104) via an I/O operation, after which the physical memory 114 may be freed and repurposed.

Page sharing is yet another reclamation process. In page sharing, guest pages that contain identical content are found within the same virtual machine (e.g., VM1) or across different VMs (e.g., VM1, VM2). The guest pages that contain identical content are mapped to the same page in the physical memory 114.

Compression is another reclamation process. In this process, a guest memory page is compressed, which permits more memory pages to be stored in a standard sized memory page. In some embodiments, one or more memory pages may be compressed together.

Page sharing is an opportunistic process and may be carried out as background processes. As between ballooning and swapping, memory scheduler 142 can select an appropriate reclamation process for each virtual machine based on the allocation target. Compression is an optimization that can be performed in addition to swapping. When the hypervisor 102 decides to swap out a page, it will first try to see if it can be compressed instead.

Figure 2:
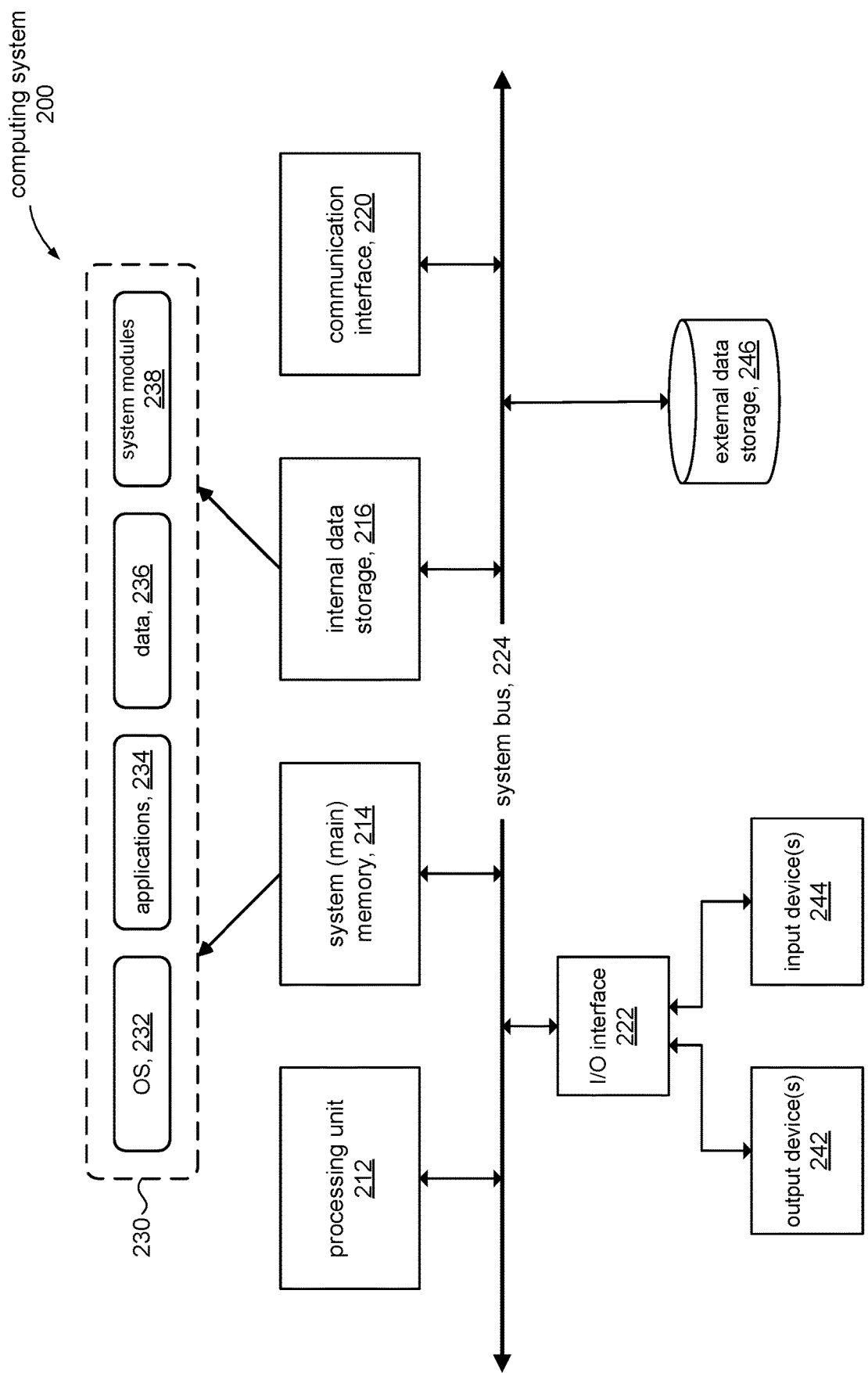
FIG. 2 shows a computer system adapted in accordance with the present disclosure.

FIG. 2 is a simplified block diagram of an illustrative computing system 200 for implementing one or more of the embodiments described herein (e.g., host machine 102, FIG. 1). The computing system 200 can perform and/or be a means for performing, either alone or in combination with other elements, operations in accordance with the present disclosure. Computing system 200 can also perform and/or be a means for performing any other steps, methods, or processes described herein.

Computing system 200 can include any single- or multi-processor computing device or system capable of executing computer-readable instructions. Examples of computing system 200 include, for example, workstations, servers, distributed computing systems, and the like. In a basic configuration, computing system 200 can include at least one processing unit 212 and a system (main) memory 214.

Processing unit 212 can comprise any type or form of processing unit capable of processing data or interpreting and executing instructions. The processing unit 212 can be a single processor configuration in some embodiments, and in other embodiments can be a multi-processor architecture comprising one or more computer processors. In some embodiments, processing unit 212 can receive instructions from program and data modules 230. These instructions can cause processing unit 212 to perform operations in accordance with the various disclosed embodiments (e.g., FIGS. 5, 6) of the present disclosure.

System memory 214 (sometimes referred to as main memory; e.g., physical memory 114) can be any type or form of storage device or storage medium capable of storing data and/or other computer-readable instructions, and comprises volatile memory and/or non-volatile memory. Examples of system memory 214 include any suitable byte-addressable memory, for example, random access memory (RAM), read only memory (ROM), flash memory, or any other similar memory architecture. Although not required, in some embodiments computing system 200 can include both a volatile memory unit (e.g., system memory 214) and a non-volatile storage device (e.g., data storage 216, 246).

In some embodiments, computing system 200 can include one or more components or elements in addition to processing unit 212 and system memory 214. For example, as illustrated in FIG. 2, computing system 200 can include internal data storage 216, a communication interface 220, and an I/O interface 222 interconnected via a system bus 224. System bus 224 can include any type or form of infrastructure capable of facilitating communication between one or more components comprising computing system 200.

Internal data storage 216 can comprise non-transitory computer-readable storage media to provide nonvolatile storage of data, data structures, computer-executable instructions, and so forth to operate computing system 200 in accordance with the present disclosure. For instance, the internal data storage 216 can store various program and data modules 230, including for example, operating system 232, one or more application programs 234, program data 236, and other program/system modules 238 to perform various processing and operations disclosed herein.

Communication interface 220 can include any type or form of communication device or adapter capable of facilitating communication between computing system 200 and one or more additional devices. For example, in some embodiments communication interface 220 can facilitate communication between computing system 200 and a private or public network including additional computing systems.

In some embodiments, communication interface 220 can also represent a host adapter configured to facilitate communication between computing system 200 and one or more additional network or storage devices via an external bus or communications channel. Examples of host adapters include, for example, SCSI host adapters, USB host adapters, IEEE 1394 host adapters, SATA and eSATA host adapters, ATA and PATA host adapters, Fibre Channel interface adapters, Ethernet adapters, or the like.

Computing system 200 can also include at least one output device 242 (e.g., a display) coupled to system bus 224 via I/O interface 222, for example, to provide access to an administrator. The output device 242 can include any type or form of device capable of visual and/or audio presentation of information received from I/O interface 222.

Computing system 200 can also include at least one input device 244 coupled to system bus 224 via I/O interface 222, e.g., for administrator access. Input device 244 can include any type or form of input device capable of providing input, either computer or human generated, to computing system 200. Examples of input device 244 include, for example, a keyboard, a pointing device, a speech recognition device, or any other input device.

Computing system 200 can also include external data storage subsystem 246 coupled to system bus 224. In some embodiments, the external data storage 246 can be accessed via communication interface 220. External data storage 246 can be a storage subsystem comprising a storage area network (SAN), network attached storage (NAS), virtual SAN (VSAN), and the like. External data storage 246 can comprise any type or form of block storage device or medium capable of storing data and/or other computer-readable instructions. For example, external data storage 246 can be a magnetic disk drive (e.g., a so-called hard drive), a solid state drive, a floppy disk drive, a magnetic tape drive, an optical disk drive, a flash drive, or the like. In some embodiments, storage subsystem 104 in FIG. 1 can comprise external data storage subsystem 246.

FIG. 3 illustrates some underlying principles for reclaiming physical memory 114 in accordance with the present disclosure. FIG. 3 three classes of allocations of physical memory 114 to a virtual machine 122. The memSize limit refers to the size of guest physical memory that the VM is configured with; e.g., 512 GB. The active classification refers to an estimated working set size of the virtual machine. The "working set" in a VM can be defined as the set of pages (the active pages, active memory, etc.) that has been most recently accessed by the VM. The working set can be used within the memory scheduler 142 to estimate the memory demands of the VM. The memNeeded classification refers to an amount of physical memory to allow the VM to run a workload (e.g., guest OS, apps, etc.) with no performance loss in terms of memory resources, as if the VM had no memory constraint at the hypervisor level.

When a VM is allocated an amount of physical memory in excess of memNeeded, the excess physical memory can be deemed safe to reclaim for subsequent re-allocation among the deployed VMs. Physical memory in excess of the active level but less than memNeeded can indicate that some of the physical memory is used by buffer caches in the guest OS that is not actively used, but might affect guest OS performance if reclaimed. If the size of physical memory allocated to the VM is at the level of active, then physical memory should not be reclaimed from that VM since doing so can decrease performance.

In some embodiments of the present disclosure, memory reclamation can take into account in-guest pressure which indicates whether a guest OS is experiencing memory pressure or not. We say that there is memory pressure inside a guest OS if a least two out of the following conditions are true:

Free Memory is less than memFrac
Buffer Cache is less than memFrac
SwapinRate is greater than SwapInRateMax Here memFrac is a threshold value representing the percentage of total guest memory, while the SwapInRateMax corresponds to the maximum amount of memory swapped in per second. We can capture the in-guest pressure as a Boolean value: False means no memory pressure inside the guest and True means high memory pressure.

When the host machine 102 is overcommitted on memory, the hypervisor 112 need to reclaim physical memory from each VM. In accordance with the present disclosure, a metric called pressureLimit can be used to control memory reclamation from VMs. The pressureLimit metric takes into account in-guest memory pressure. Basically reclaiming more than the pressure limit can increase significantly the pressure inside the guest. In accordance with the present disclosure, the pressureLimit metric can be initially set to memNeeded and can go as low as active over time if memory must be reclaimed beyond memNeeded. If in-guest pressure is detected, we stop decreasing pressureLimit. In some embodiments, the pressureLimit metric can be updated every time the memory 142 scheduler needs this value to distribute the memory in order to have the most up-to-date data.

In accordance with the present disclosure the pressureLimit metric in a guest OS can evolve between memNeeded and active. Initially, pressureLimit can be set to memNeeded and evolves between memNeeded and active as memory needs to be reclaimed. In some embodiments, for example, we can compute a page per share (PPS) for each VM, and then consider the maxPPS and minPPS. The PPS for a VM can be defined as a weighted number of pages allocated per share as a function of the VM's current allocation of physical memory, the VMs' configured shares, and the VM's current active memory pages. For the same memory allocation, the VM's PPS value is inversely proportional to its shares and active pages. For example, for two VM's (e.g., VM1, VM2), if VM1 has larger shares and active pages than VM2, then VM1 should receive a greater allocation of physical memory. In case both VMs are currently allocated with the same amount of memory, then the current PPS value of VM1 will be smaller than VM2.

FIG. 4 shows a reclamation schedule that takes into account the pressureLimit metric. Physical memory allocated between memSize and memNeeded can be safely reclaimed from the VM, as in FIG. 3, since doing so will not affect VM performance. Memory between memNeeded and pressureLimit might be reclaimed, but it has to be done slowly by detecting and taking into consideration in-guest pressure. For memory below pressureLimit, we reclaim it as the last resort to deal with host memory overcommit.

A memory scheduler 142 in accordance with the present disclosure can exhibit the following behavior. The memory scheduler 142 always respects reservations and limits. It also respects memory shares as long as a VM is actively using its memory budget (allocation target). If the VM has inactive memory in its budget, the memory scheduler 142 may reclaim the unused (excess) physical memory for other purposes. In some embodiments, the memory scheduler 142 can consider three different scenarios:

1. When the host is undercommitted, no memory reclamation is required.
2. When the host is slightly overcommitted, the memory scheduler 142 can reclaim some memory. The process will first reclaim from VMs consuming more memory than memNeeded. If more memory needs to be reclaimed, the process will reclaim between memNeeded and active based on in-guest pressure in order to minimize the effect of the reclamation on guests performance.
3. When the host is heavily overcommitted and reclamation based on memNeeded and in-guest pressure is not sufficient, memory distribution is based only on shares, reservation and limit.

Figure 5:
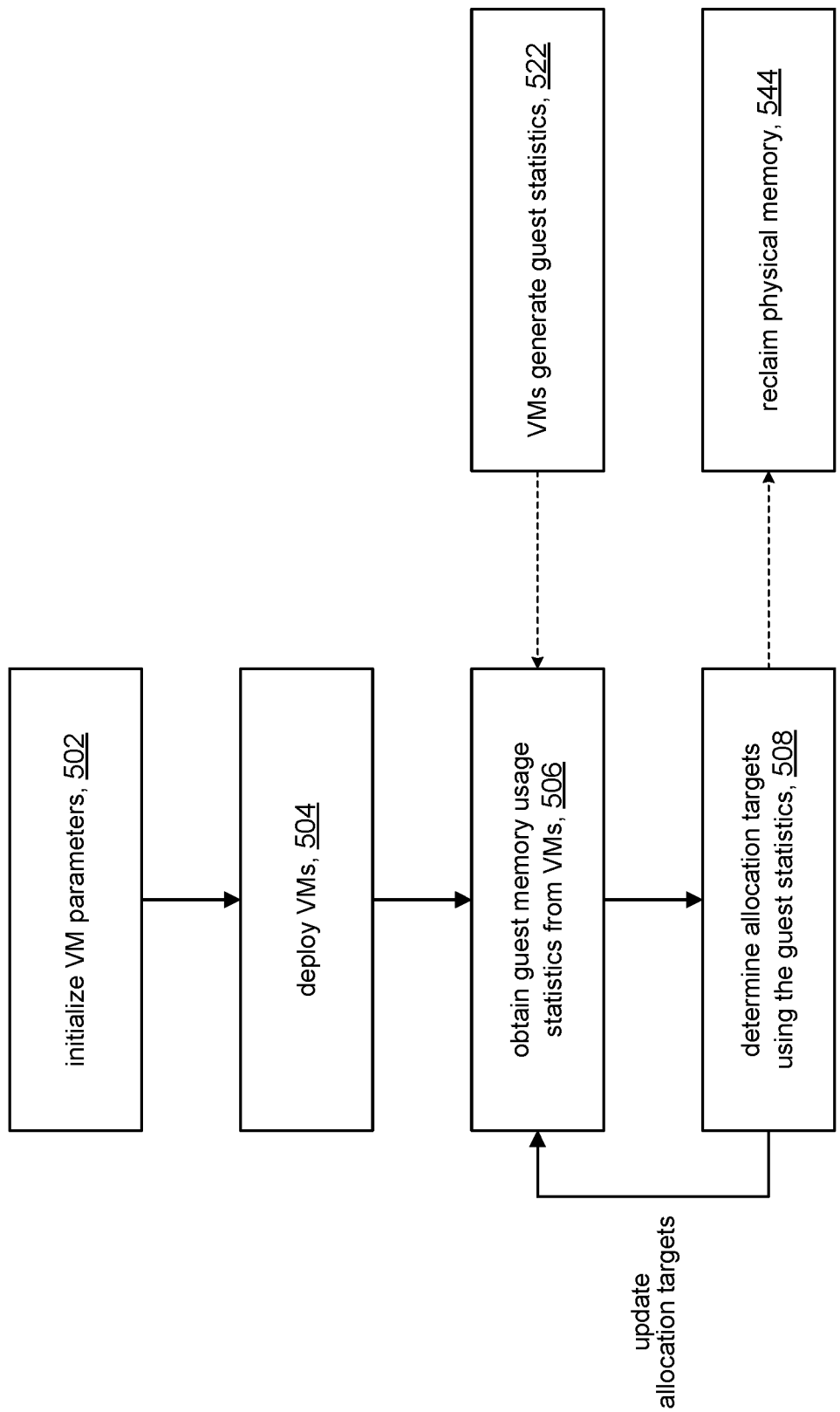
FIG. 5 is a high level flow for memory scheduling in accordance with the present disclosure.

Referring now to FIG. 5 and other figures, the discussion will now turn to a high level description of operations and processing by the host machine 102 to deploy and execute virtual machines (VMs) 122 in accordance with the present disclosure. In some embodiments, for example, the host machine 102 can include computer executable program code, which when executed by it processor(s) (e.g., 212, FIG. 2), can cause the host machine to perform processing in accordance with FIG. 5. The operation and processing blocks described below are not necessarily executed in the order shown, and can be allocated for execution among one ore more concurrently executing processes and/or threads.

At block 502, the host machine can configure each virtual machine (VM) to be deployed, including initializing parameters for managing the allocation of physical memory (e.g., 114) to each executing VM. Typically, the host machine will allocate physical memory to the deployed VMs on an as needed basis. For example, the allocation of physical memory occurs when a VM (e.g., VM1, FIG. 1) references an address (or range of addresses) in its guest physical memory (guest pmeml) that is not currently backed by physical memory. Eventually, the host machine will run out of physical memory to allocate to a VM unless it can reclaim some physical memory from other VMs. To control memory allocation, an administrator can specify memory reservation, limit and shares (RLS) for each VM. Memory reservation provides a guarantee of a minimum amount of memory available to the VM, while memory limit puts an upper bound on the allocation. Memory shares set relative priority of VMs in their memory allocation. Each VM can be configured with its own reservation, limit, and shares parameters.

At block 504, the host machine can deploy the configured VMs. This may include defining and configuring virtual hardware for each VM, including the VMs guest physical memory. The host machine can back the guest physical memory for each VM by allocating physical memory to the VM. The amount of physical memory initially allocated to a VM at deployment typically will not be equal to the size of the guest physical memory configured for that VM. For example, a VM may be configured with 256 GB of guest physical memory, but may only be backed by 16 GB of physical memory; e.g., enough to allow the guest OS to boot up. As noted above, the host machine can allocate additional physical memory to the VM as applications executing on the VM begin consuming its guest physical memory, for example, via kernel drivers installed in the guest OS.

At block 506, the host machine (e.g., via the memory scheduler 142) can obtain memory usage statistics from the VMs. In accordance with the present disclosure, the memory scheduler can obtain statistics from the guest OSs executing on the VMs. The memory usage statistics provide an indication of the memory needs of the guest OSs. It is expected that a guest OS executing on a VM will have the most accurate information about its own memory usage. By comparison, the host machine can only know how much physical memory is allocated to a VM, but not whether the allocated memory is actually used. The host machine can track page fault events to determine active percentage of the allocated memory to approximate the actual memory demand of the VM. However, a page fault tends to cause noticeable performance impact during each VM memory access since each page fault can cause a VM exit, which can significantly impact VM performance. Statistics generated by the guest OS, on the other hand, will minimally impact VM performance and at the same provide much more accurate information about its memory needs than can be gleaned by the host machine.

At block 508, the host machine (e.g., via the memory scheduler 142) can determine allocation targets for each VM using memory usage statistics obtained from that VM. The allocation target for a VM represents the amount of physical memory that should be allocated to the VM. As will be discussed below, the allocation target for a VM can be used to determine whether physical memory allocated to the VM should be reclaimed. In accordance with the present disclosure, the allocation target can be based on one or more memory usage statistics obtained from the VM, for example, from the guest OS executing on the VM. By using the guest-generated statistics, an allocation target can be determined that more accurately reflects the actual needs of the VM than estimates produced using information generated by the host machine treating the VM as a "black box."

Processing can return to block 506 in order to update the allocation targets based on updated guest OS statistics. The allocation targets can be periodically updated by repeating the processing in blocks 506 and 508; e.g., every few seconds or so. In this way, the allocation targets can dynamically reflect the memory needs of their respective VMs as operating conditions change. VM performance can be maintained over the lifetimes of their deployment because the distribution of physical memory can be dynamically adjusted as VMs memory demands increase. Fairness of memory distribution is achieved because physical memory in VMs that have less demand for memory can be reclaimed so that the memory can be allocated to other VMs as their memory needs increase.

At block 522, in accordance with the present disclosure, the guest OS in each VM can generate and provide one or more memory usage statistics. In some embodiments, for example, the guest OSs can provide a memory usage statistic referred herein as memNeeded. As explained above the memNeeded statistic can represent the amount of physical memory that needs to be allocated to a given VM to run a workload (e.g., guest OS, apps, etc.) with no performance loss in terms of memory resources, as if the VM had no memory constraint at the hypervisor level. For example, a VM may be configured with 512 GB of virtual RAM. If the current workload on the VM required only 200 GB of RAM, then memNeeded would be 200 GB, referring to 200 GB of physical memory. In some embodiments, the allocation target determined in block 506 can be based on the memNeeded statistic. This aspect of the present disclosure is discussed in more detail below.

Merely for illustrative purposes, memNeeded may be computed in each guest OS using their respective memory usage according to the following pseudo-code:

```
memAvailable = getStatsFromProcInfo( )
PhysicalMemory = getStatsFromZoneInfo( )
memNeededReservation = PhysicalMemory / 20
if (memAvailable > memNeededReservation) {
    memAvailable -= memNeededReservation; } else {
    memAvailable = 0;
}
memNeeded = PhysicalMemory - memAvailable
``` where: memAvailable refers to the available "physical" (virtual) memory on the VM;

PhysicalMemory refers to the amount of "physical" memory configured on the VM;

memNeededReservation provides a 5% buffer for extra safety; and memNeeded is the amount of host physical memory that should allocated to the VM.

In some embodiments, for example, memNeeded can be computed by a user-level guest tool on the VM. The guest tool can then communicate memNeeded to the hypervisor, for example, via a kernel-level driver in the guest OS. The above pseudo-code assumes library functions in a Linux-based OS, but can be based on any suitable OS.

At block 544, the host machine (e.g., via reclamation module 144) can reclaim physical memory from one or more VMs based on their respective allocation targets and the amount of physical memory allocated to them. The allocation target in a given VM can be reduced (e.g., at block 508) if that VM has more physical memory allocated to it than is suggested by the refinement criteria (e.g., memNeeded). This has the effect of causing memory to be reclaimed from the VM so that it can be reused; e.g., allocated to other deployed VMs. For example, if the allocation target associated with a given VM is 20 GB and the VM has been allocated 50 GB of physical memory, then 30 GB of physical memory can be reclaimed from the VM. Since the allocation target is based on memNeeded, and memNeeded in turn is determined by the guest OS itself based on its memory needs, the reclamation of 30 GB from the VM should not affect VM performance. It can be appreciated that by using information (e.g., memNeeded) from the VM itself (e.g., via its guest OS) the computed allocation target represents a more accurate assessment of the physical memory needs of the VM than can be achieved if the memory scheduler 142 relied on information obtained by monitoring only the activity of the host machine's physical memory 114.

Figure 6:
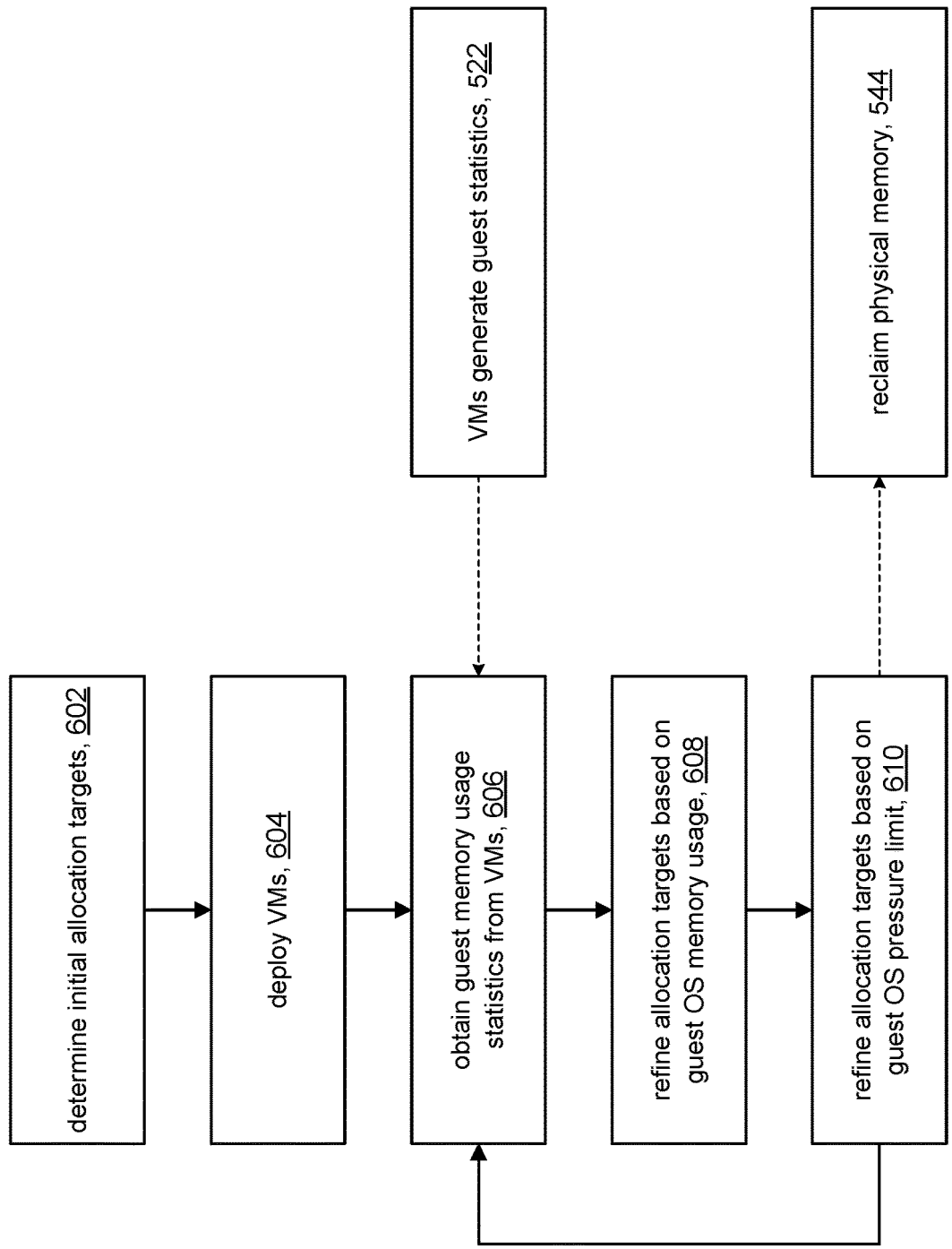
FIG. 6 is a high level flow for memory scheduling in accordance with the present disclosure.

Referring to FIG. 6 and other figures, the discussion will now turn to a high level description of operations and processing by the host machine 102 to deploy and execute virtual machines (VMs) 122 in accordance with other embodiments of the present disclosure. In some embodiments, for example, the host machine 102 can include computer executable program code, which when executed by it processor(s) (e.g., 212, FIG. 2), can cause the host machine to perform processing in accordance with FIG. 6. The operation and processing blocks described below are not necessarily executed in the order shown, and can be allocated for execution among one ore more concurrently executing processes and/or threads.

At block 602, the host machine can configure each virtual machine (VM) to be deployed, including initializing parameters for managing the allocation of host physical memory (e.g., 114) to each executing VM as explained above. In some embodiments, initial allocation target values can be set for each VM to be deployed. For example, the initial allocation targets can be based on the reservation, limit, and shares parameters described above. Additional details are described below.

At block 604, the host machine can deploy the configured virtual machines as described above in connection with block 504.

At block 606, the host machine (e.g., via the memory scheduler 142) can obtain memory usage statistics from the VMs (e.g., generated by the guest OSs at block 522) as described above in connection with block 506.

At block 608, the host machine (e.g., via the memory scheduler 142) can refine the allocation targets of the deployed VMs using the memory usage statistics generated by the VMs. At block 602, the allocation targets were initialized based on statically determined parameters, namely reservation, limit, and shares. In accordance with the present disclosure, the allocation targets can be refined based on actual operating conditions in the VM, which can be exposed via the guest-generated memory usage statistics. In some embodiments, for example, each guest OS can compute or otherwise produce the memNeeded statistic described above, which can serve as a basis for refining the allocation targets.

At block 610, the host machine (e.g., via the memory scheduler 142) can further refine the allocation targets based on the VM's pressureLimit metric discussed above.

Processing can return to block 606 in order to update the allocation targets based on updated guest OS statistics. The allocation targets can be continually updated by repeating the processing in blocks 606 and 608; e.g., every few seconds or so. Although not shown in FIG. 6, in some embodiments, the update loop can include block 602 in addition to blocks 606 and 608, where the allocation targets are initialized based on their RLS parameters and the refined in blocks 606 and 608.

FIG. 7 shows pseudo-code module 700 that illustrates processing in the memory scheduler 142 to determine allocation target values in accordance with some embodiments of the present disclosure. The pseudo-code module 700 is called GFMS (guest-friendly memory schedule) to reflect the fact that the allocation targets can be based on information provided by the VMs in order to reclaim physical memory for redistribution among deployed VMs based on memory needs of the VMs as determined by the processes (e.g., guest OSs) operating within the VMs. The module 700 takes two parameters:

vms—This is a data structure that specifies attributes for the virtual machines to be deployed, including:

vm.allocTarget—Specifies the allocation target.

vm.allocMin—This is the minimum value for the allocation target for a VM. If the host has enough memory allocMin will be satisfied for every VM. During each iteration of the GFMS algorithm, this input is set to reservation, memNeeded and pressure limit subsequently.

vm.allocMax—Specifies the maximum allocation target which is set to the limit parameter.

alloc—This specifies total budget of physical memory to be allocated among the VMs in the vm data structure. The budget can be equal to or less than the available physical memory 114 in the host machine 102.

The module 700 is divide into three phases:

Code block 702: Distribution based on the reservation parameter—Since the reservation parameter for each VM is enforced, we first pass reservation as allocMin to a distribution function to honor the reservation. This step should always succeed and leads to a first draft of vm.allocTarget for each VM. When the distribution function returns, all memory is distributed based on the reservation parameter, but it may not be the ideal distribution.

Code block 704: Improvement of vm.allocTarget based on memNeeded—In this step we improve the initial distribution based on the memNeeded parameter obtained from each VM. To achieve that we set vm.allocMin to memNeed and call the distribution function. In the case where vm.allocTarget is greater than memNeeded for all VMs, the distribution is unchanged. The goal is to search for VMs that are willing to surrender some memory. If a VM has its allocation target greater than its memNeeded, we consider that it is safe to reclaim physical memory from that VM.

Code block 706: Improvement of vm.allocTarget based on pressure limit—In this step we again improve the distribution, this time based on pressureLimit by setting vm.allocMin to each VMs pressureLimit. In that case where vm.allocTarget is greater than pressureLimit for all VMs, the distribution is unchanged. Otherwise the distribution is revised to accommodate the pressure inside the guest.

FIG. 8 shows pseudo-code module 800 for distributing memory among VMs in accordance with some embodiments of the present disclosure, and takes two parameters: a list of vms and an amount of memory (alloc) to distribute. The memory to distribute will be either the total memory of the host (code block 702) or the extra memory left from a previous call to memory distribution function (code blocks 704, 706). Note that the amount of memory to distribute is designated as alloc and that it can be zero if all the memory was already distributed but the distribution needs improvement. In that case the function will evaluate the VMs with extra memory and VMs that need more memory and will reclaim physical memory (FIG. 9) and redistribute the reclaimed physical memory (FIGS. 10, 10A, 10B) according to allocMin by altering the VMs associated allocation targets.

Processing in the distribution module 800 proceeds in three phases:
  Step 1: Initial distribution and VM sorting—During this step, physical memory is allocated strictly based on the shares parameter; keeping in mind that physical memory is not actually allocated, but rather the allocation targets are determined. Then allocTarget is compared to allocMin and VMs are divided into two groups:
    VMs that want more memory (group A), if allocTarget<allocMin
    VMs that have extra memory (group B), otherwise.
  We consider the delta between allocTarget and allocMin for each VM to reclaim the right amount of memory.
  Step 2: Reclamation from VMs with extra memory—During this step we reclaim memory from VMs in group B. The amount of memory to reclaim was calculated in the previous step. The reclamation is calculated to respect the shares parameter if physical memory can be reclaimed from multiple VMs (FIG. 9).
  Step 3: Distribution of the reclaimed memory—In this final step we distribute memory reclaimed in the previous step. The memory is distributed to the VMs in group A according to the shares parameter (FIGS. 10, 10A, 10B).

FIG. 11 illustrates an example with two VMs that have the same configuration, but produce different values of memNeeded. Units are in megabyte (MB)s and the total budget (allot) of physical memory 114 for all the VMs is 2000 Mb.

Referring to module 700, we first divide memory based on reservation (block 702). In our example, the VMs have no reservation parameter set, so we divide the memory budget purely based on the shares parameter. Since shares is the same, then both VM1 and VM2 receive 1000 MB each; i.e., the allocation targets associated respectively with VM1 and VM2 are set to 1000 MB at Step 1 in FIG. 11.

Then in block 704, VM2 provides to the memory scheduler 142 a memNeeded value of 750 MB, indicating that its guest OS has determined it only need 750 MB of physical memory to operate without any performance hit. VM1 similarly provides to the memory scheduler 142 a memNeeded value of 1250 MB, indicating that its guest OS has determined it needs 1250 MB of physical memory to operate without any performance hit. As such, 250 MB can be reclaimed from VM2 and allocated to VM1. Thus, the allocation target for VM1 is readjusted (increased) to 1250 MB and the allocation target for VM2 is readjusted (decreased) to 750 MB, at Step 2 in FIG. 11. Processing in block 706 does not change the allocation as both VMs have their memNeeded satisfied.

FIG. 12 illustrates another example with two VMs that have the same configuration, where produce different values of memNeeded that sum to more than the total physical memory budget (allot) of 2000 Mb.

Referring to module 700, we first divide memory based on the reservation parameter. In our example, the VMs have no reservation parameter set, so we divide the memory budget purely based on the shares parameter. Since shares is the same, then both VM1 and VM2 receive 1000 MB each; i.e., the allocation targets associated respectively with VM1 and VM2 are set to 1000 MB at Step 1 in FIG. 12.

In block 704, VM1 indicates memNeeded of 1400 MB and VM 2 indicates memNeeded of 1300 MB. As such, the allocation targets of VM1 and VM2 will not change. However, in block 706, we improve the allocation based on the pressure limit. According to this statistic, VM2 will not experiencing in-guest pressure with 750 Mb of memory and VM1 will not complain with 1250 Mb of memory. Accordingly, processing in block 706 will redistribute the allocation of physical memory to 1250 Mb for VM1 and 750 Mb for VM2 as show in Step 3 in FIG. 12.

CONCLUSION

We have disclosed a guest friendly memory scheduler 142 that honors guest-generated estimations for memory demand. In this way, the hypervisor 102 can avoid extra memory pressure to the VM on top of what the workloads running inside the VM are already experiencing. A memory scheduler in accordance with the present disclosure allows the hypervisor 102 to reclaim physical memory while reducing the chances of impacting guest OS performance. This is especially significant when memory is overcommitted because it ensures that the memory can be reclaimed from VMs that have more memory than their guest OSs indicate is need so that it can be allocated to other VMs. Scheduling memory using guest-originated statistics (e.g., memNeeded) allows the hypervisor to react faster to a workload change and to be more accurate in the estimate of VM memory demands, thus improving performance of the VMs.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a host computer, the method comprising:
deploying a plurality of virtual machines that execute on the host computer;
allocating physical memory of the host computer to each of the plurality of virtual machines during execution of the virtual machines;
determining allocation targets for each of the plurality of virtual machines, including:
obtaining at least one memory usage metric from each virtual machine;
computing a value for each virtual machine using the memory usage metric obtained from that virtual machine; and
setting the allocation target associated with each virtual machine using its corresponding computed value;
selecting a reclamation process, wherein the reclamation process is selected from a plurality of reclamation processes based on the allocation target associated with each virtual machine, wherein the selected reclamation process is used to reclaim physical memory allocated to each virtual machine; and
using the selected reclamation process to reclaim physical memory allocated to each virtual machine.

2. The method of claim 1, wherein the memory usage metric is indicative of an amount of memory needed by the virtual machine.

3. The method of claim 1, wherein the at least one memory usage metric is computed by the virtual machine.

4. The method of claim 1, wherein obtaining the at least one memory usage metric from the virtual machine includes a hypervisor executing on the host computer communicating with a guest operating system (OS) executing on the virtual machine.

5. The method of claim 1, further comprising periodically updating the allocation targets associated with the plurality of virtual machines.

6. The method of claim 1, further comprising periodically reclaiming physical memory allocated to one or more of the plurality of virtual machines based on their respective associated allocation targets.

7. A non-transitory computer-readable storage medium having stored thereon computer executable instructions, which when executed by a computer device, cause the computer device to:
deploy a plurality of virtual machines that execute on the host computer;
allocate physical memory of the host computer to each of the plurality of virtual machines during execution of the virtual machines;
determine allocation targets for each of the plurality of virtual machines, including:
obtaining at least one memory usage metric from each virtual machine;
computing a value for each virtual machine using the memory usage metric obtained from that virtual machine; and
setting the allocation target associated with each virtual machine using its corresponding computed value;
select a reclamation process, wherein the reclamation process is selected from a plurality of reclamation processes based on the allocation target associated with each virtual machine, wherein the selected reclamation process is used to reclaim physical memory allocated to each virtual machine; and
use the selected reclamation process to reclaim physical memory allocated to the each virtual machine.

8. The non-transitory computer-readable storage medium of claim 7, wherein the memory usage metric is indicative of an amount of memory needed by the virtual machine.

9. The non-transitory computer-readable storage medium of claim 7, wherein the at least one memory usage metric is computed by the virtual machine.

10. The non-transitory computer-readable storage medium of claim 7, wherein obtaining the at least one memory usage metric from the virtual machine includes a hypervisor executing on the host computer communicating with a guest operating system (OS) executing on the virtual machine.

11. The non-transitory computer-readable storage medium of claim 7, wherein the computer executable instructions, which when executed by the computer device, further cause the computer device to periodically update the allocation targets associated with the plurality of virtual machines.

12. The non-transitory computer-readable storage medium of claim 7, wherein the computer executable instructions, which when executed by the computer device, further cause the computer device to periodically reclaim physical memory allocated to one or more of the plurality of virtual machines based on their respective associated allocation targets.

13. An apparatus comprising:
one or more computer processors; and
a computer-readable storage medium comprising instructions for controlling the one or more computer processors to be operable to:
deploy a plurality of virtual machines that execute on the host computer;
allocate physical memory of the host computer to each of the plurality of virtual machines during execution of the virtual machines;
determine allocation targets for each of the plurality of virtual machines, including:
obtaining at least one memory usage metric from each virtual machine;
computing a value for each virtual machine using the memory usage metric obtained from that virtual machine; and
setting the allocation target associated with each virtual machine using its corresponding computed value;
select a reclamation process, wherein the reclamation process is selected from a plurality of reclamation processes based on the allocation target associated with each virtual machine, wherein the selected reclamation process is used to reclaim physical memory allocated to each virtual machine; and use the selected reclamation process to reclaim physical memory allocated to the each virtual machine.

14. The apparatus of claim 13, wherein the memory usage metric is indicative of an amount of memory needed by the virtual machine.

15. The apparatus of claim 13, wherein the at least one memory usage metric is computed by the virtual machine.

16. The apparatus of claim 13, wherein the computer-readable storage medium further comprises instructions for controlling the one or more computer processors to be operable to periodically update the allocation targets associated with the plurality of virtual machines.

17. The apparatus of claim 13, wherein the computer-readable storage medium further comprises instructions for controlling the one or more computer processors to be operable to periodically reclaim physical memory allocated to one or more of the plurality of virtual machines based on their respective associated allocation targets.

18. The apparatus of claim 13, wherein obtaining the at least one memory usage metric from the virtual machine includes a hypervisor executing on the host computer communicating with a guest operating system (OS) executing on the virtual machine.

\* \* \* \* \*